(12) United States Patent
Lee et al.

(10) Patent No.: US 7,923,167 B2
(45) Date of Patent: Apr. 12, 2011

(54) POLYMER ELECTROLYTE MEMBRANE, METHOD OF MANUFACTURING THE SAME AND FUEL CELL USING THE POLYMER ELECTROLYTE MEMBRANE

(75) Inventors: Jin-gyu Lee, Seoul (KR); Myung-sup Jung, Seongnam-si (KR); Do-yun Kim, Seongnam-si (KR); Young-gyoon Ryu, Suwon-si (KR); Jae-jun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 731 days.

(21) Appl. No.: 11/546,006

(22) Filed: Oct. 10, 2006

(65) Prior Publication Data

US 2007/0099055 A1 May 3, 2007

(30) Foreign Application Priority Data

Oct. 7, 2005 (KR) .................. 10-2005-0094507

(51) Int. Cl.
*H01M 8/04* (2006.01)
(52) U.S. Cl. ......... 429/494; 429/523; 429/530; 427/115
(58) Field of Classification Search .............. 429/33, 429/44, 523, 530, 494
See application file for complete search history.

(56) References Cited

U.S. PATENT DOCUMENTS

| | | | |
|---|---|---|---|
| 5,958,648 A * | 9/1999 | Nishimura et al. | 430/270.1 |
| 7,157,204 B2 * | 1/2007 | Jung et al. | 430/270.1 |
| 2002/0058425 A1 * | 5/2002 | Richter et al. | 438/780 |
| 2005/0282919 A1 * | 12/2005 | Cao et al. | 521/27 |

FOREIGN PATENT DOCUMENTS

| | | |
|---|---|---|
| JP | 2001-222910 | 8/2001 |
| JP | 2004101761 A * | 4/2004 |
| JP | 2004-349034 | 12/2004 |

OTHER PUBLICATIONS

Patent Abstracts of Japan, Publication No. 2004-349034, dated Dec. 9, 2004.
SIPO Office action dated Feb. 12, 2010, for corresponding Chinese application 200610139995.5, noting U.S. references previously cited in Office actions dated Jul. 2, 2009 and Jan. 7, 2010.
JPO Office action dated May 11, 2010, for corresponding Japanese Application No. 2006-272080, listing the cited reference in this IDS as well as JP 2004-349034 previously filed in an IDS dated Jan. 8, 2007.
SIPO Office action dated Aug. 4, 2010, for corresponding Chinese Patent application 200610139995.5, with English translation.

* cited by examiner

*Primary Examiner* — Melvin C Mayes
*Assistant Examiner* — Melissa Stalder
(74) *Attorney, Agent, or Firm* — Christie, Parker & Hale, LLP (57) ABSTRACT

A polymer electrolyte membrane including an ionic conducting polymer and a light-irradiated product of a photoacid generator (PAG), a method of manufacturing the same, and a fuel cell using the same. The polymer electrolyte membrane has excellent proton conductivity and homogeneity by radiating light such as UV light onto the PAG, thereby producing an acid radical which generates an acid. The polymer electrolyte membrane also suppresses methanol crossover well. The polymer electrolyte membrane can be used as an electrolyte membrane of a fuel cell, for example, a direct methanol fuel cell.

10 Claims, 4 Drawing Sheets

POLYMER ELECTROLYTE MEMBRANE, METHOD OF MANUFACTURING THE SAME AND FUEL CELL USING THE POLYMER ELECTROLYTE MEMBRANE

CROSS-REFERENCE TO RELATED PATENT APPLICATION

This application claims priority to and the benefit of Korean Patent Application No. 10-2005-0094507, filed on Oct. 7, 2005, in the Korean Intellectual Property Office, the disclosure of which is incorporated herein in its entirety by reference.

BACKGROUND OF THE INVENTION

1. Field of the Invention

The present invention relates to a polymer electrolyte membrane and a fuel cell using the same, and more particularly, to a polymer electrolyte membrane having excellent proton conductivity and a fuel cell using the same.

2. Description of the Related Art

Conventional fuel cells can be classified into polymer electrolyte membrane full cells (PEMFC), phosphoric acid fuel cells, molten carbonate fuel cells, solid oxide fuel cells, etc. according to the type of electrolyte included therein. The operating temperature of a fuel cell and the constituent materials thereof are determined by the type of electrolyte used in the fuel cell.

Fuel cells can also be classified into an external reformer type fuel cell in which fuel is supplied to an anode after being converted into a hydrogen-rich gas by an external reformer, and an internal reformer type fuel cell or direct fuel supply type fuel cell in which a fuel in a gaseous or liquid state is directly supplied to an anode A representative example of a direct liquid fuel cell is a direct methanol fuel cell (DMFC). In a DMFC, an aqueous methanol solution is used as fuel, and a proton exchange polymer membrane with proton conductivity is used as an electrolyte. Accordingly, a DMFC is a type of PEMFC.

PEMFCs are small and lightweight, but can achieve a high output density. Furthermore, a power generation system can be easily formed using PEMFCs.

The basic structure of a PEMFC may include an anode (fuel electrode), a cathode (oxidizing agent electrode), and a polymer electrolyte membrane interposed between the anode and the cathode. The anode may include a catalyst layer to promote the oxidation of a fuel. The cathode may include a catalyst layer to promote the reduction of an oxidizing agent.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient proton conductivity, electrochemical stability, high mechanical strength and thermal stability at its operating temperature, and thin layers of the polymer electrolyte membrane should be easily made.

However, since conventional polymer electrolyte membranes do not have satisfactory proton conductivity and methanol cross-over, improvements in polymer electrolyte membranes are required.

SUMMARY OF THE INVENTION

In one embodiment, the present invention provides a polymer electrolyte membrane having excellent homogeneity and proton conductivity, and a method of manufacturing the same.

In another embodiment, the present invention also provides a fuel cell using the polymer electrolyte membrane to reduce cross-over of methanol, thereby improving efficiency.

According to an embodiment of the present invention, there is provided a polymer electrolyte membrane including: an ionic conducting polymer; and a light-irradiated product of a photoacid generator (PAG).

In another embodiment, the ionic conducting polymer may include at least one material selected from the group consisting of polyimide, polyvinylalcohol, fluorinated polymer, vinylidene fluoride-hexafluoropropylene copolymer, polyvinylidene fluoride, polyether sulfone, and poly ether ether ketone.

In an embodiment, a PAG may include at least one compound having a functional group selected from the group consisting of sulfonium salts and a sulfonyl group.

In yet another embodiment, a PAG may include at least one compound selected from the group consisting of Diphenyliodonium-5-hydroxynaphthalene-1-sulfonate in Formula 1, Dimethyl (4,7-dihydroxynaphthalene) sulfonium-p-toluenesulfonate in Formula 2, Diphenyliodonium, 9,10-Dimethoxy Anthracene-2-sulfonate in Formula 3, p-Nitrobenzyl 9,10-Dimethoxy Anthracene-2-sulfonate in Formula 4, compounds in Formula 5 through 7, Bis(cyclohexylsulfonyl)diazomethane, triphenylsulfonium-p-toluenesulfonate, triphenylsulfonium cyclohexanesulfamate and mixtures thereof.

[Formula 1]

[Formula 2]

[Formula 3]

-continued

[Formula 4]

[Formula 5]

[Formula 6]

[Formula 7]

The amount of the light irradiated product of a PAG may be in the range of 0.5-90 parts by weight based on 100 parts by weight of the ionic conducting polymer.

According to another embodiment of the present invention, a method of manufacturing a polymer electrolyte membrane is provided including: mixing an ionic conducting polymer, a photoacid generator (PAG), and a solvent to form a composite for forming an electrolyte; applying the composite; irradiating the light onto the applied composite; and performing a heat treatment to the light irradiated product.

According to another embodiment of the present invention, a fuel cell is provided including: a cathode; an anode; and the polymer electrolyte membrane interposed between the cathode and the anode described above.

In an embodiment, the cathode may include a carbon supported platinum (Pt/C) catalyst and the anode may include a carbon supported platinum—ruthenium (Pt—Ru/C) catalyst.

BRIEF DESCRIPTION OF THE DRAWINGS

The above and other embodiments of the present invention will become more apparent by describing in detail exemplary embodiments thereof with reference to the attached drawings in which.

DETAILED DESCRIPTION OF EMBODIMENTS
OF THE INVENTION

A polymer electrolyte membrane according to an embodiment of the present invention includes an ionic conducting polymer and a light-irradiated product of a photoacid generator (PAG). A PAG is a material that generates an acid in response to light irradiation. In one embodiment, the PAG is a compound having one or more functional groups selected from sulfonium salts and a sulfonyl group and produces a sulfonate group in response to light irradiation.

The light-irradiated product of a PAG according to an embodiment refers to a protonated product in which a proton is bonded to the resulting product obtained by the light irradiation.

The amount of the light-irradiated product of a PAG may be in the range of 0.5-90 parts by weight based on 100 parts by weight of an ionic conducting polymer. When the amount of the light-irradiated product of a PAG is below this range, conductivity is barely improved. When the amount of the light-irradiated product of a PAG is above this range, the membrane is not homogenous.

Examples of the PAG include, but are not limited to compounds such as: Diphenyliodonium-5-hydroxynaphthalene-1-sulfonate in Formula 1, Dimethyl (4,7-dihydroxynaphthalene) sulfonium-p-toluenesulfonate in Formula 2, Diphenyliodonium, 9,10-Dimethoxy Anthracene-2-sulfonate in Formula 3, p-Nitrobenzyl 9,10-DimethoxyAnthracene-2-sulfonate in Formula 4, compounds in Formula 5 through 7, Bis(cyclohexylsulfonyl)diazomethane, triphenylsulfonium-p-toluenesulfonate, triphenylsulfonium cyclohexanesulfamate and mixtures thereof.

[Formula 1]

[Formula 2]

[Formula 3]

[Formula 4]

[Formula 5]

[Formula 6]

[Formula 7]

Examples of the ionic conducting polymer used in an embodiment include polyimide, polyvinylalcohol, fluorinated polymer, vinylidene fluoride-hexafluoropropylene copolymer, polyvinylidene fluoride, and mixtures thereof.

Examples of the polyimide include, but are not limited to, the compound represented by Formula 8 below.

[Formula 8]

In an embodiment, where m and n are molar fractions, m may be in the range of 0.1-0.9, for example 0.3-0.7, and n may be in the range of 0.1-0.9, for example, 0.3-0.7.

In one embodiment, the degree of polymerization of the polyimide is in the range of 5-1000.

In the polymer electrolyte membrane of an embodiment, if the ionic conducting polymer is hydrophobic or hydrophilic, a hydrophobic PAG or a hydrophilic PAG is used accordingly to obtain a homogenous polymer electrolyte membrane having optimal ionic conductivity due to excellent mutual miscibility.

The thickness of the polymer electrolyte membrane of an embodiment may be in the range of 5-150 μm. When the thickness is below this range, the polymer electrolyte membrane may be torn due to weakness. When the thickness is above this range, a crack may occur in the membrane.

A method of manufacturing the polymer electrolyte membrane according to an embodiment will now be described.

A composite for forming the polymer electrolyte membrane according to one embodiment is obtained by mixing an ionic conducting polymer, a PAG and a solvent.

In an embodiment, the amount of the light-irradiated product of a PAG may be in the range of 0.5-90 parts by weight based on 100 parts by weight of an ionic conducting polymer. When the amount of the light-irradiated product of a PAG is below this range, conductivity is barely improved. When the amount of the light-irradiated product of a PAG is above this range, the membrane is not homogenous.

In one embodiment, examples of the solvent include N-methylpyrrolidone, N, N'-dimethylacetamide, dimethyl formamide, and dimethyl sulfoxide and the amount of the solvent is in the range of 30-95 parts by weight based on 100 parts by weight of the ionic conducting polymer. When the amount of the solvent is below this range, the resultant solution is not homogeneous. When the amount of the solvent is above this range, solid content in the composite for forming the polymer electrolyte membrane is too low.

In an embodiment, the composite for forming the polymer electrolyte membrane is applied to a substrate. Methods of applying include spin coating and bar coating, but are not limited thereto. Then, light is radiated onto the coated composite and a heat treatment is performed.

In the light irradiation process of an embodiment, the wavelength of light can be in the range of 350-450 nm and the intensity of the light irradiation may be in the range of 200-50,000 mJ/cm². When the intensity of the light irradiation is below this range, the amount of the light-irradiated product of a PAG is low. When the intensity of the light irradiation is above this range, the mechanical strength of the resultant polymer electrolyte membrane is low. In one embodiment, the duration of the light irradiation process is in the range of 10-990 seconds.

In an embodiment, the heat treatment is a hard baking process performed in the range of 120-200° C. When the temperature is below this range, the polymer membrane may be only slightly hardened. When the temperature is above this range, a sulfonate group contained in the light-irradiated product of a PAG and the polymer electrolyte membrane is decomposed, and thus the effect of the PAG is negligible. In another embodiment, the length of the heat treatment may vary according to the temperature, and may be in the range of 0.5-24 hours.

In an embodiment, a preliminary heat treatment can be further performed prior to above described light irradiation. The preliminary heat treatment is a soft baking process performed in the range of 60-110° C. to remove the solvent from the applied composite for forming the polymer electrolyte membrane. When the temperature is below this range, solvent removal is time consuming. When the temperature is above this range, the solvent is rapidly removed, thereby forming an inhomogeneous polymer electrolyte membrane.

The length of the heat treatment time can vary according to the temperature, and in an embodiment may be in the range of 0.5-24 hours.

Figure 1:
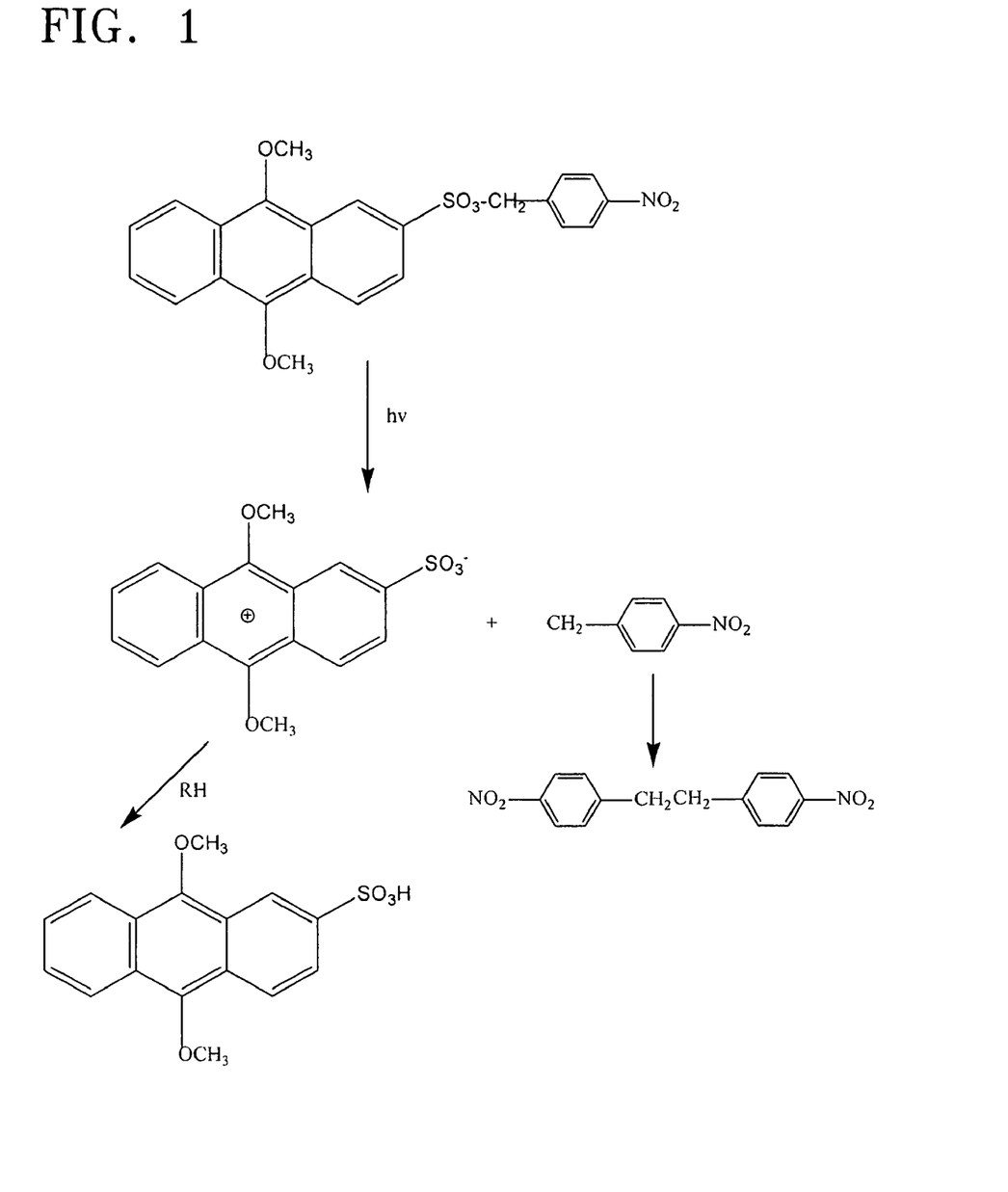
FIG. 1 is a diagram illustrating a reaction that occurs when irradiating light on p-Nitrobenzyl and 9,10-DimethoxyAnthracene-2-sulfonate used as a photoacid generator.

PAG changes that occur when light is radiated in the above described process are shown in FIG. 1. FIG. 1 illustrates when p-nitrobenzyl and 9,10-dimethoxy anthracene-2-sulfonate (Nidians) are used as the PAG. Referring to FIG. 1, if the light is radiated onto Nidians, a compound (A) having $SO_3^-$ and a compound (B) are formed. The compound (A) reacts due to relative humidity (RH) in the air to obtain a final product (C), in which a proton is combined with the reactant of the light irradiation of PAG. A compound (D), a residual product, may be left or removed according to the conditions of a heat treatment on the final product.

The polymer electrolyte membrane obtained according to the above process can be used as an electrolyte membrane of a fuel cell.

A fuel cell according to an embodiment of the present invention includes a cathode, an anode, and the polymer electrolyte membrane interposed between the cathode and the anode.

The cathode and anode each include a gas diffusion layer and a catalyst layer. The catalyst layer includes a metal catalyst to promote required reactions (oxidation of hydrogen and reduction of oxygen). In an embodiment, the catalyst layer may include at least one catalyst selected from the group consisting of Pt, Ru, Os, a Pt—Os alloy, a Pt—Pd alloy and a Pt—M alloy (M includes at least one transition metal selected from the group consisting of Ga, Ti, V, Cr, Mn, Fe, Co, Ni, Cu and Zn). In another embodiment, the catalyst layer includes at least one catalyst selected from the group consisting of Pt, Ru, Os, a Pt—Ru alloy, a Pt—Os alloy, a Pt—Pd alloy, a Pt—Co alloy and a Pt—Ni alloy.

In an embodiment, the metal catalyst can sit on a support. The support may be carbon, such as acetylene black or graphite, or inorganic particulates, such as alumina or silica. A noble metal catalyst on a support, which is commercially available or may be prepared by impregnating the noble metal into the support, can be used.

The gas diffusion layer may be made of carbon paper or carbon cloth, but is not limited thereto. The gas diffusion layer supports the anode or the cathode and diffuses a reaction gas into the catalyst layer. In an embodiment, the gas diffusion layer can be made of carbon paper or carbon cloth which is water-repellent treated with a fluorine-based resin such as polytetrafluoroethylene since the water repellence can prevent the lowering of the gas diffusion efficiency by water that can occur when the fuel cell operates.

The electrodes can further include a microporous layer between the gas diffusion layer and the catalyst layer in order to further enhance the gas diffusion effect. In an embodiment, the microporous layer is formed by applying to the gas diffusion layer or the catalyst layer a composition including a conducting material, such as carbon powder, carbon black, activated carbon or acetylene black, a binder, such as polytetrafluoroethylene, and, if necessary, an ionomer.

The fuel cell according to an embodiment of the present invention may be a phosphoric acid fuel cell (PAFC), a polymer electrolyte membrane fuel cell (PEMFC), an alkaline fuel cell, or preferably a direct methanol fuel cell (DMFC).

Figure 2:
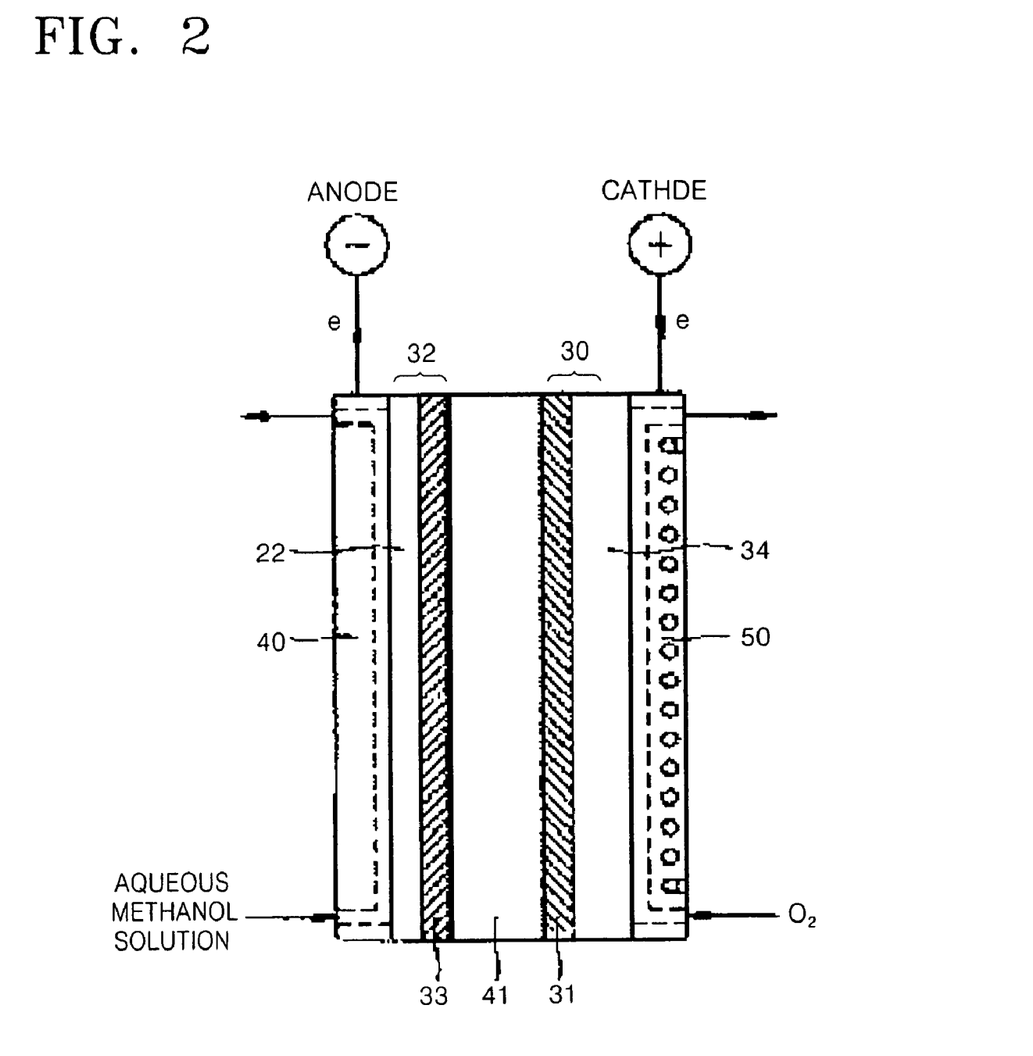
FIG. 2 is a cross-sectional view of a direct methanol fuel cell (DMFC) according to an embodiment of the present invention.

A DMFC according to an embodiment of the present invention including the polymer electrolyte membrane will now be described with reference to FIG. 2.

The DMFC includes an anode 32 to which a fuel is supplied, a cathode 30 to which an oxidant is supplied, and an electrolyte membrane 41 interposed between the anode 32 and the cathode 30. The anode 32 can be composed of an anode diffusion layer 22 and an anode catalyst layer 33 and the cathode 30 can be composed of a cathode diffusion layer 34 and a cathode catalyst layer 31.

The aqueous methanol solution transported to the anode catalyst layer 33 through the anode diffusion layer 22 is decomposed into electrons, protons, carbon dioxide, etc. The protons are transported to the cathode catalyst layer 31 through the polymer electrolyte membrane 41, the electrons are transported to an external circuit, and the carbon dioxide is discharged to the outside. In the cathode catalyst layer 31, the protons transported through the polymer electrolyte membrane 41, electrons supplied from an external circuit, and the oxygen in the air transported through the cathode diffusion layer 34 react to produce water. Reference numbers 40 and 50 denote a bipolar plate on the anode and cathode, respectively.

The present invention will now be described in greater detail with reference to the following examples. The following examples are for illustrative purposes only and are not intended to limit the scope of the invention.

Example 1

A composite for forming a polymer electrolyte membrane was manufactured by mixing 23.1 parts by weight of polyimide, 4.6 parts by weight of Diphenyliodonium-5-hydroxynaphthalene-1-sulfonate in Formula 1, and 72.3 parts by weight of N-methylpyrrolidone as a solvent.

The composite for forming the polymer electrolyte membrane was spin coated and a preliminary heat treatment was performed thereon at 80° C. for 10 minutes.

Then, heat with a wavelength of 365 nm was radiated onto the resultant structure for 900 seconds and then a heat treatment was performed at 200° C. for 1.5 hours to manufacture a polymer electrolyte membrane (thickness: 20 μm).

Example 2

A polymer electrolyte membrane (thickness: 53 μm) was manufactured according to Example 1, except that the weight ratio of polyimide to Diphenyliodonium-5-hydroxynaphthalene-1-sulfonate in Formula 1 was 28.3:8.3.

Example 3

A polymer electrolyte membrane (thickness: 25 μm) was manufactured according to Example 1, except that vinylidene fluoride-hexafluoropropylene copolymer [P(VdF-HFP)] was used instead of polyimide and the weight ratio of P(VdF-HFP) to Diphenyliodonium-5-hydroxynaphthalene-1-sulfonate in Formula 1 was 15.4:4.6.

Example 4

A polymer electrolyte membrane (thickness: 168 μm) was manufactured according to Example 3, except that the weight ratio of P(VdF-HFP) to Diphenyliodonium-5-hydroxynaphthalene-1-sulfonate in Formula 1 was 22.9:7.1.

Example 5

A polymer electrolyte membrane (thickness: 24 μm) was manufactured according to Example 1, except that NAFION™ was used instead of polyimide, the weight ratio of NAFION™ to Diphenyliodonium-5-hydroxynaphthalene-1-sulfonate in Formula 1 was 15:5, and the heat treatment was performed at 100° C. for 1.5 hours after the preliminary heat treatment. Then, the polymer electrolyte membrane was additionally immersed in a 1 M aqueous hydrochloric solution at 80° C. to allow protonation, and rinsed with distilled water several times.

Example 6

A polymer electrolyte membrane (thickness: 21 μm) was manufactured according to Example 5, except that the weight ratio of NAFION™ to Diphenyliodonium-5-hydroxynaphthalene-1-sulfonate in Formula 1 was 15:12.5.

Example 7

A polymer electrolyte membrane (thickness: 46 μm) was manufactured according to Example 1, except that Dimethyl (4,7-dihydroxynaphthalene) sulfonium-p-toluenesulfonate in Formula 2 was used instead of Diphenyliodonium-5-hydroxynaphthalene-1-sulfonate in Formula 1 and the weight ratio of polyimide to Dimethyl (4,7-dihydroxynaphthalene) sulfonium-p-toluenesulfonate in Formula 2 was 23.1:4.6.

Example 8

A polymer electrolyte membrane (thickness: 28 μm) was manufactured in the same manner as in Example 7, except that the weight ratio of polyimide to Dimethyl (4,7-dihydroxynaphthalene) sulfonium-p-toluenesulfonate in Formula 2 was 25:5.

Example 9

A polymer electrolyte membrane (thickness: 28 μm) was manufactured according to Example 1, except that diphenyliodonium, 9,10-Dimethoxy Anthracene-2-sulfonate of Formula 3 was used instead of Diphenyliodonium-5-hydroxynaphthalene-1-sulfonate in Formula 1 and the weight ratio of polyimide to diphenyliodonium, 9,10-Dimethoxy Anthracene-2-sulfonate was 25:5.

Example 10

A polymer electrolyte membrane (thickness: 55 μm) was manufactured according to Example 9, except that the weight ratio of polyimide to diphenyliodonium, 9,10-Dimethoxy Anthracene-2-sulfonate was 28.3:8.3.

Example 11

A polymer electrolyte membrane (thickness: 48 μm) was manufactured according to Example 1, except that Nidians was used instead of Diphenyliodonium-5-hydroxynaphthalene-1-sulfonate in Formula 1 and the weight ratio of polyimide to Nidians was 23.1:4.6.

Example 12

A polymer electrolyte membrane (thickness: 30 μm) was manufactured according to Example 11, except that the weight ratio of polyimide to Nidians was 25:5.

Comparative Example 1

A composite for forming a polymer electrolyte membrane was obtained by mixing 30 parts by weight of polyimide and 70 parts by weight of N-methylpyrrolidone as a solvent.

The composite for forming a polymer electrolyte membrane was coated and a preliminary heat treatment was performed thereon at 80° C. for 10 minutes. Then, a hard baking process was performed under a nitrogen atmosphere at 200° C. for 1.5 hours to manufacture a polymer electrolyte membrane (thickness: 23 μm).

Comparative Example 2

A polymer electrolyte membrane (thickness: 17 μm) was manufactured according to Comparative Example 1, except that 10 parts by weight of vinylidene fluoride-hexafluoropropylene copolymer was used instead of 30 parts by weight of polyimide.

Comparative Example 3

A polymer electrolyte membrane (thickness: 92 μm) was manufactured according to Comparative Example 1, except that 20 parts by weight of NAFION™ solution (Dupont) was used instead of 30 parts by weight of polyimide, and the heat treatment was performed at 100° C. for 1.5 hours after the preliminary heat treatment. Then, the polymer electrolyte membrane was ionized according to Example 5.

Example 13

Preparing Fuel Cell

A fuel cell having the polymer electrolyte membrane obtained according to Example 1 was manufactured as follows.

A carbon supported platinum (Pt/C) catalyst was used as a cathode and a carbon supported platinum-ruthenium (Pt—Ru/C) catalyst was used as an anode.

The polymer electrolyte membrane of Example 1 was interposed between the cathode and the anode and the result was hot-pressed at 120° C. at a pressure of 5 MPa to manufacture a Membrane and electrode assembly (MEA) for a fuel cell.

A bipolar plate for supplying fuel and a bipolar plate for supplying an oxidant were respectively attached to the anode and the cathode of the fuel cell and then, the performance of the fuel cell was determined. The operating conditions were as follows: 3 mL/min of a 1M aqueous methanol solution as fuel, 50 ml/min of air as an oxidant, and an operating temperature of 50° C.

Comparative Example 4

A fuel cell was prepared according to Example 13, except that the polymer electrolyte membrane of Comparative Example 1 was used instead of the polymer electrolyte membrane of Example 1.

Figure 3:
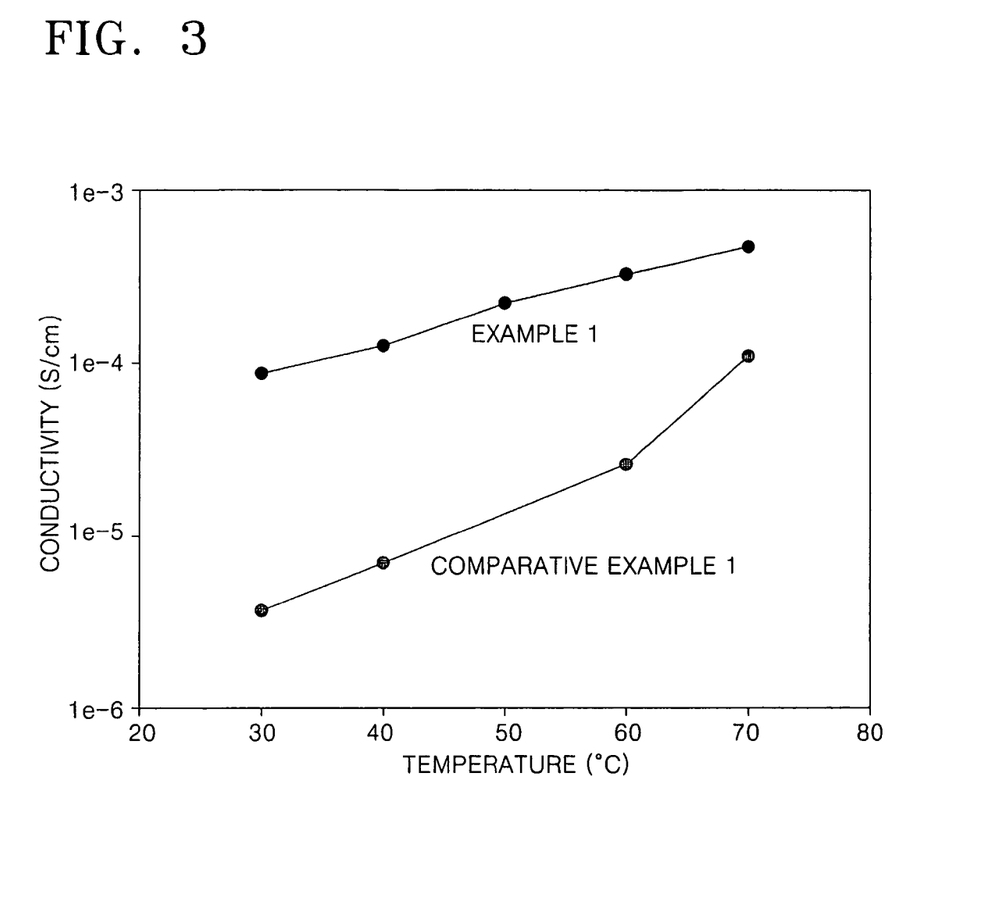
FIG. 3 is a graph illustrating the ionic conductivities of polymer electrolyte membranes obtained according to Example 1 and Comparative Example 1.

The ionic conductivities of the polymer electrolyte membranes obtained according to Example 1 and Comparative Example 1 were measured, and the results are illustrated in FIG. 3.

The ionic conductivity was measured by immersing the membrane in distilled water for a sufficient amount of time, interposing the membrane between two electrodes, applying an alternating current (10 mV amplitude) at various frequencies in the range of 1 Hz to 4 MHz to the membrane using a 2-point probe method, and measuring complex impedance at each frequency using an impedance analyzer. Using the measured resistance of the membrane, the ionic conductivity was calculated using Formula 1 below. This process was performed in a chamber in which the humidity was maintained at 90%.

$$\sigma = I/(R \times S), \qquad \text{Equation 1}$$

where $\sigma$ is the ionic conductivity, I is the thickness of the membrane, R is the resistance of the membrane, and S is the cross sectional area of the membrane.

Referring to FIG. 3, the ionic conductivity was much higher in the polymer electrolyte membrane of Example 1 than in the polymer electrolyte membrane of Comparative Example 1.

Figure 4:
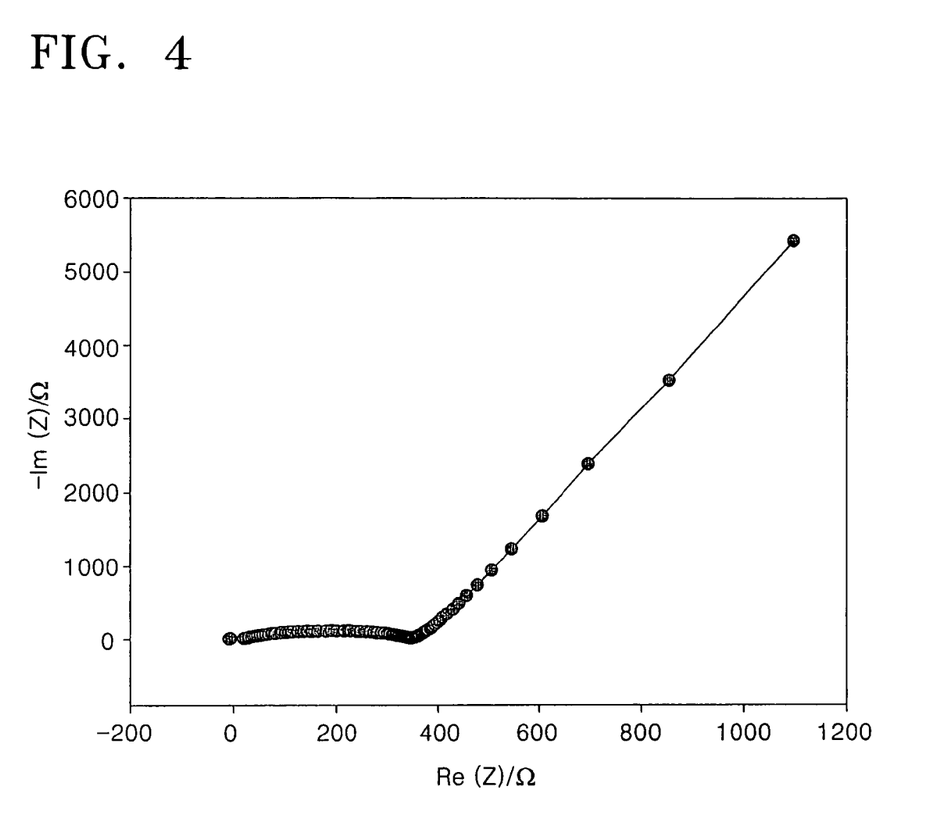
FIG. 4 is a graph illustrating the results of an impedance test for a polyimide membrane performed after being deposited in water for 24 hours.

FIG. 4 illustrates the results of an impedance test for a polyimide membrane after being deposited in water for 24 hours.

Referring to FIG. 4, the measured impedance Z was represented by $Z = Re(Z) + iIm(Z)$.

The ionic conductivities of the polymer electrolyte membranes manufactured according Examples 1 through 9 and Comparative Examples 1 through 3 were measured, and the results are shown in Table 1 below.

Also, the permeability of methanol in the fuel cells according to Example 1 and Comparative Example 4 were measured, and the results are shown in Table 1 below. Here, the permeability of methanol of a membrane was measured at an ambient temperature using diffusion cells. To measure the permeability of methanol, the membrane was interposed between two cells and the concentration of the methanol permeating the membrane was measured in a constant time interval by gas chromatography analysis. From the measurement, the permeability of the methanol was calculated.

TABLE 1

|  | Proton conductivity (S/cm) | Methanol permeability (cm$^2$/s) |
| --- | --- | --- |
| Example 1 | $5.8 \times 10^{-5}$ | $2.02 \times 10^{-9}$ |
| Example 2 | $7.14 \times 10^{-5}$ | $2.15 \times 10^{-9}$ |
| Example 3 | $2.0 \times 10^{-7}$ | $<10^{-9}$ |
| Example 4 | $1.15 \times 10^{-5}$ | $<10^{-9}$ |
| Example 5 | $2.41 \times 10^{-3}$ | $6.62 \times 10^{-7}$ |
| Example 6 | $2.80 \times 10^{-3}$ | $7.01 \times 10^{-7}$ |
| Example 7 | $3.72 \times 10^{-5}$ | $2.11 \times 10^{-9}$ |
| Example 8 | $2.64 \times 10^{-5}$ | $2.31 \times 10^{-9}$ |
| Example 9 | $6.0 \times 10^{-5}$ | $1.02 \times 10^{-9}$ |
| Example 10 | $7.4 \times 10^{-5}$ | $1.82 \times 10^{-9}$ |
| Example 11 | $5.7 \times 10^{-5}$ | $1.11 \times 10^{-9}$ |
| Example 12 | $6.1 \times 10^{-5}$ | $1.31 \times 10^{-9}$ |
| Comparative Example 1 | $2.6 \times 10^{-6}$ | $2.73 \times 10^{-9}$ |
| Comparative Example 2 | $5.7 \times 10^{-11}$ | $<10^{-9}$ |
| Comparative Example 3 | $1.68 \times 10^{-3}$ | $1.58 \times 10^{-6}$ |

As illustrated in Table 1, when a membrane was manufactured by blending the PAG and the polymer electrolyte membrane, the proton conductivity was high due to the generation of an acid radical. Also, by adding the PAG, the suppression of methanol permeability was equal to or greater than in the prior art.

The polymer electrolyte membrane of the present invention has excellent proton conductivity and homogeneity by radiating light such as UV light onto the PAG, thereby producing an acid radical which generates an acid. Such a polymer electrolyte membrane also suppresses methanol crossover well.

The polymer electrolyte membrane can be used as an electrolyte membrane of a fuel cell, for example, a DMFC.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte membrane consisting essentially of:
   an ionic conducting polymer selected from the group consisting of polyimide, polyvinylalcohol, fluorinated polymer, vinylidene fluoride-hexafluoropropylene copolymer, polyvinylidene fluoride, polyether sulfone, poly ether ether ketone, and combinations thereof; and
   a light-irradiated product of a photoacid generator (PAG), wherein the PAG includes a compound selected from the group consisting of Diphenyliodonium-5-hydroxynaphthalene-1-sulfonate in Formula 1, Dimethyl (4,7-dihydroxynaphthalene) sulfonium-p-toluenesulfonate in Formula 2, Diphenyliodonium, 9,10-Dimethoxy Anthracene-2-sulfonate in Formula 3, p-Nitrobenzyl 9,10-Dimethoxy Anthracene-2-sulfonate in Formula 4, compounds in Formula 5 through Formula 7, Bis(Cyclohexylsulfonyl)diazomethane, triphenylsulfonium-p-toluenesulfonate, triphenylsulfonium cyclohexanesulfamate, and combinations thereof:

[Formula 1]

[Formula 2]

[Formula 3]

[Formula 4]

[Formula 5]

[Formula 6]

[Formula 7]

wherein the polymer electrolyte membrane is a polymer electrolyte membrane for a fuel cell.

2. The polymer electrolyte membrane of claim 1, wherein the amount of the light-irradiated product of a PAG is in the range of 0.5-90 parts by weight based on 100 parts by weight of the ionic conducting polymer.

3. A method of manufacturing a polymer electrolyte membrane comprising:
   mixing a composite consisting essentially of an ionic conducting polymer selected from the group consisting of polyimide, polyvinylalcohol, fluorinated polymer, vinylidene fluoride-hexafluoropropylene copolymer, polyvinylidene fluoride, polyether sulfone, poly ether ether ketone, and combinations thereof, a photoacid generator (PAG), and a solvent;
   applying the composite to a substrate;
   irradiating light onto the applied composite; and
   heat treating the light irradiated product,
   wherein the PAG includes a compound selected from the group consisting of Diphenyliodonium-5-hydroxynaphthalene-1-sulfonate in Formula 1, Dimethyl (4,7-dihydroxynaphthalene) sulfonium-p-toluenesulfonate in Formula 2, Diphenyliodonium, 9,10-Dimethoxy Anthracene-2-sulfonate in Formula 3, p-Nitrobenzyl 9,10-Dimethoxy Anthracene-2-sulfonate in Formula 4, compound in Formula 5 through Formula 7, Bis(Cyclohexylsulfonyl)-diazomethane, triphenylsulfonium-p-toluenesulfonate, triphenylsulfonium cyclohexanesulfamate, and combinations thereof:

wherein the polymer electrolyte membrane is a polymer electrolyte membrane for a fuel cell.

4. The method of claim 3, further comprising performing a preliminary heat treatment at a temperature in the range of 60-110° C. prior to the operation of irradiating the light.

5. The method of claim 3, wherein the light utilized for the irradiating the light has a wavelength in the range of 350-450 nm and an intensity in the range of 200-50,000 mJ/cm$^2$.

6. The method of claim 3, wherein the amount of the PAG is in the range of 0.5-90 parts by weight based on 100 parts by weight of the ionic conducting polymer.

7. The method of claim 3, wherein the solvent includes a compound selected from the group consisting of N-Methyl-2-pyrrolidone, dimethyl formamide, dimethyl sulfoxide, N,N'-dimethylacetamide, and combinations thereof, and the amount of the solvent is in the range of 30-95 parts by weight based on 100 parts by weight of the ionic conducting polymer.

8. The method of claim 3, wherein the temperature of the heat treatment is in the range of 120-200° C.

9. A fuel cell comprising:
   a cathode;
   an anode; and
   the polymer electrolyte membrane of claim 1 interposed between the cathode and the anode.

10. The fuel cell of claim 9, wherein the cathode includes a carbon supported platinum (Pt/C) catalyst and the anode includes a carbon supported platinum-ruthenium (Pt—Ru/C) catalyst.

* * * * *

UNITED STATES PATENT AND TRADEMARK OFFICE
CERTIFICATE OF CORRECTION

PATENT NO. : 7,923,167 B2  
APPLICATION NO. : 11/546006  
DATED : April 12, 2011  
INVENTOR(S) : Jin-gyu Lee et al.

Page 1 of 1

It is certified that error appears in the above-identified patent and that said Letters Patent is hereby corrected as shown below:

In the Claims

Column 16, line 26, Claim 4     Delete "irradiating the light",  
                                           Insert -- the irradiating light --

Column 16, line 28, Claim 5     Delete "irradiating the light",  
                                           Insert -- the irradiating light --

Signed and Sealed this  
Thirteenth Day of March, 2012

David J. Kappos  
*Director of the United States Patent and Trademark Office*